3,216,982
CATALYSTS FOR POLYMERIZATION
Adam Orzechowski, Waltham, and James C. MacKenzie,
Wellesley Hills, Mass., assignors to Cabot Corporation,
Boston, Mass., a corporation of Delaware
No Drawing. Filed Mar. 28, 1963, Ser. No. 268,589
The portion of the term of the patent subsequent to
Jan. 18, 1982, has been disclaimed
23 Claims. (Cl. 260—88.2)

This invention relates to the polymerization and copolymerization of mono-olefins and/or di-olefins such as ethylene, propylene, butene-1, styrene, isoprene and butadiene and includes within its scope improved catalysts for the polymerization of the aforementioned classes of monomers.

This case is a continuation in part of copending applications, Serial No. 2,861, filed January 18, 1960, and Serial No. 21,110, filed April 11, 1960, both by Orzechowski and MacKenzie, and both now abandoned.

It is a principal object of the present invention to provide a process for the polymerization of mono-, di-olefins and mixtures thereof.

It is another object of this invention to provide novel catalysts for the polymerization of mono-, di-olefins and mixtures thereof.

Other objects of this invention will in part be obvious and will in part appear hereinafter.

Said copending applications disclose catalyst components suitable for use in the polymerization and copolymerization of mono- and di-olefins, which components comprise the product of the metathetical reaction carried out under certain conditions between a halide-type compound of a Group IVa, Va or VIa metal and hydroxyl groups on the surface of a finely-divided particulate inorganic solid. In accordance with the present invention, it has been discovered that excellent polymerization catalysts are obtained when said catalyst components are combined, under suitable conditions, with certain organometallic compounds comprising germanium, tin or lead.

The polymerization and copolymerization of the mono- and/or di-olefins can be effected at suitable temperatures within the range of from about —25° C. to about 250° C., and pressures ranging upwardly from about atmospheric pressures to any desired maximum pressure, for example, 30,000 p.s.i.g. or even higher pressures.

Inorganic solids suitable for the purposes of the present invention generally include any inorganic compound which is available in finely-divided particulate form with hydroxyl groups on the surface thereof. For example, oxides such as alumina, zirconia and silica, silicates such as chrysotile, and aluminates such as corundum are all generally suitable for the purposes of the present invention. For best results, however (as explained in detail in said copending application Serial No. 2,861), inorganic solids having an average particle diameter of less than about 0.1 microns are definitely preferred.

Halide-type compounds of Group IVa, Va or VIa (hereinafter generally referred to as transistion metal halides) suitable for the purposes of the present invention, are compounds conforming to the general empirical formula

wherein T is a metal of Groups IVa, Va or VIa (where the group numbers correspond to the Mendeleev Periodic System); O is oxygen; $a$ is number from 0 to 2; each X is any halogen; and $b$ is a number from 1 to 6.

Examples of suitable compounds conforming to said general formula

are halides of Groups IVa, Va or VIa metals such as titanium tetrachloride, zirconium tetrachloride, vanadium tetrachloride and titanium tetraiodide, and oxyhalides such as vanadium oxychloride and chromium oxychloride.

The conditions under which reaction between the transition metal halide and the finely-divided inorganic solid can be accomplished are subject to considerable variation as explained in detail in Serial No. 2,861, for example. However, in order to obtain a catalyst component with exceptionally high activity and reproducible character it has been found to be all important that the finely-divided inorganic solid be essentially dry and anhydrous (i.e. free of molecular water in any form) at the time it is brought into contact with the transition metal halide. In addition, it is recommended that said reaction be achieved so as to allow by-products of the reaction (for example, HCl) to be eliminated from the reaction zone in order to insure that said reaction goes to completion. Generally, said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture. Generally speaking, almost any temperature between about 0° C. and about 300° C. can be used satisfactorily, but room temperature to about 105° C. is generally definitely preferred. Assuming provision is made for intimate contact of the dry inorganic solid and the transition metal halide, the *minimum* time required to accomplish the chemical reaction needed will vary from periods of about 10 hours at room temperature to periods of about 15 minutes at temperatures of 100° C. or over. Temperatures higher than about 300° C., e.g. 500° C., are completely needless and therefore of little or no interest.

Elimination of by-products of the reaction from the reaction zone, i.e. the reaction medium, can be accomplished in many ways, such as by sweeping the reaction vessel with an inert gas, by carrying out the reaction at sufficiently elevated temperatures to drive by-products out of the reaction zone, i.e. usually out of the reaction medium, or by complexing or reacting said by-products with suitable substances such as tertiary arsines, tertiary phosphines, terpenes, terpinenes, tetrasubstituted hydrazines, carbides such as calcium carbide, and other substances such as sodium hydride which will react or complex with said by-products and thereby eliminate them.

Organometallic compounds suitable for the purposes of the present invention are those compounds conforming to the empirical formula

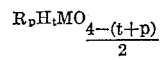

wherein each R is chosen from the group consisting of monovalent hydrocarbon radicals, monovalent alkoxy radicals, monovalent aryloxy radicals, and the halogens; $p$ is a number from 0 to 3; each H is a hydride radical; $t$ is a number from 1 to 4; M is a quadrivalent metal chosen from the group consisting of germanium, tin and lead; and O is oxygen.

Specific examples of R groups for substitution in the above formula include methyl, 2-methyl-2-butenyl, n-dodecyl, 4-cyclohexylethyl, methylnaphthylethyl, 2,2,1-bicycloheptyl, tolyl, xylyl, xenyl, methoxy, isobutoxy, n-octyloxy, phenoxy and 1,2-naphthoxy.

Specific examples of compounds conforming to the formula:

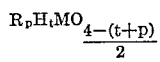

which are suitable for the purposes of the present invention are: trimethylstannane, $(CH_3)_3SnH$; triphenylstannane, $(C_6H_5)_3SnH$; dimethylstannane, $(CH_3)_2SnH_2$; triethylgermane, $(C_2H_5)_3GeH$; triphenylgermane, $(C_6H_5)_3GeH$ tri-α-naphthyl-germane, $(\alpha\text{-}C_{10}H_7)_3GeH$; tri-n-hexylgermane, $(n\text{-}C_6H_{13})_3GeH$; di-i-propylgermane, $(i\text{-}C_3H_7)_2GeH_2$ plumbane, $PbH_4$; germane, $GeH_4$; stannane, $SnH_4$; 1,2-dihydrotetramethylstannoxane, $(CH_3)_2HSnOHSn(CH_3)_2$; and the like.

The catalysts of the present invention are formed when the product of the metathetical reaction (as described above) of hydroxyl groups in the surface of an inorganic solid and a transition metal halide is combined in an inert environment with an organometallic compound at temperatures normally between about 0° C. and about 150° C. and at atmospheric pressure, although higher temperatures and pressures can be utilized. The temperatures and/or pressures that are most desirably utilized with any particular combination of components can be readily determined bearing in mind that temperatures and/or pressures that cause substantial decomposition of either of the components of the catalyst should be avoided.

Using the catalysts of this invention, polymerization of mono-olefin and/or di-olefin monomers can be accomplished in the absence of liquids (other than the monomers themselves), solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are generally suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methydecalins, and the like are suitable. Also, members of the aromatic hydrocarbon series, such as isopropyl benzene, ethyltoluene, hemimellitene, pseudocumene, isodurene, isoamylbenzene, and particularly the mononuclear aromatic hydrocarbons such as xylene, mesitylene and xylene-p-cymene mixtures, and the like are completely suitable.

The proportion of surface reacted particulate inorganic solid to organometallic compound utilized in preparing the catalysts is not usually a critical feature of the process. We have found from experience that a molar ratio of from about 0.1 to about 5 millimoles of the organometallic compound per milliatom of transition metal chemically combined with the surface of the finely-divided solid is to be preferred.

The quantity of catalyst, i.e. comprising both the surface-reacted finely-divided solid and the organo-metallic compound, to be utilized in the polymerization reaction may vary, but in general, the total quantity of catalyst that need be employed based on the weight of the charging stock is very small particularly when a very fine particle size oxide (i.e. having an average particle diameter of less than about 0.1 micron) is utilized as the inorganic solid.

The contact time or space velocity employed in the polymerization process variables such as the particular catalyst utilized, the specific type of product desired, and the extent of monomer conversion desired in any given run or pass over the catalyst. In general, this variable is readily adjustable to obtain the desired results.

There follow a number of illustrative non-limiting examples:

*Example 1*

To a 2000 milliliter, three neck, glass reaction vessel there is added 20 grams of "Cab-O-Sil," a pyrogenic silica produced by Cabot Corporation, which has an average particle diameter of 10 millimicrons and a hydroxyl group content on the surface thereof of about 1.5 milliequivalents per gram. To said reaction vessel there is added 1700 milliliters of benzene, and the resulting slurry is dried by being heated to, and maintained at, the boiling point of benzene, i.e. about 80° C., for about 20 hours, while a water/benzene azeotrope is removed from the reaction vessel by periodic distillation until about 450 milliliters of distillate has been removed. The vessel is then cooled and charged with 20 millimoles of titanium tetrachloride. The contents of the vessel are then continuously stirred, and maintained at refluxing temperature (about 80° C.) for about 6 hours while the contents of the gas phase are swept by a stream of dry nitrogen. Subsequently, the extent of the reaction between the titanium tetrachloride and the hydroxyl groups in the surface of the silica is determined by measuring the quantity of HCl that was removed by the dry nitrogen stream and by testing the liquid contents of the vessel for the absence therein of titanium tetrachloride, and said slurry is found to contain 20 milliatoms of titanium chemically bound to the surface of said silica.

To a 2000 milliliter glass, three neck, reaction flask equipped with a magnetic stirrer there is introduced about 100 milliliters of said cocatalyst slurry which contains about 2 milliatoms of titanium bound to the surface of about 2 grams of silica. Next, in total darkness, there is added to said vessel a solution comprising about 900 milliliters of anhydrous toluene and 8 millimoles of triphenylstannane. The contents of the reaction flask are then continuously agitated in darkness at ambient temperatures for about 24 hours, whereupon it is noted that the color of the solid phase has changed to a chocolate brown. Said slurry is transferred, in toto, and without exposure to the atmosphere to a 4000 milliliter, stainless steel, stirred autoclave. Next, the autoclave is pressurized to, and maintained at, about 600 p.s.i.g. with ethylene and is thereafter stirred continuously for about 48 hours at ambient temperature after which the solid reaction products are withdrawn and analyzed. It is found that about 142 grams of solid polyethylene have been produced.

When under the same conditions either the triphenylstannane or the silica cocatalyst carrying titanium chemically combined to the surface thereof is utilized alone as the catalyst, no solid polymer is produced.

*Example 2*

To a 2000 milliliter stainless steel, stirred autoclave there is introduced 50 milliliters of the cocatalyst slurry produced in Example 1 which contains about 1 milliatom of titanium bound to the surface of about 1 gram of silica. Next, there is introduced into the autoclave about 750 milliliters of anhydrous toluene and 3 millimoles of di-i-propylgermane. The autoclave is heated to, and maintained at, about 100° C. with continuous stirring for about 6 hours. Said autoclave is then cooled to, and thereafter maintained at about 80° C. and there is introduced 200 millimoles of 1,3-butadiene and 200 millimoles of ethylene. After 24 hours of continuous stirring the solid product is analyzed and it is found that a butadiene-ethylene copolymer has been produced.

Example 3

To a 4000 milliliter, three neck, glass reaction vessel there is added 10.6 grams of "Alon," a pyrogenic alumina produced by Deutsche Gold- und Silber-Scheideanstalt vormals Roessler which has an average particle diameter of about 10–40 millimicrons and a hydroxyl group content on the surface thereof of about 0.7 milliequivalent per gram. Next, there is added 2500 milliliters of toluene and the resulting slurry is heated to, and maintained at, refluxing temperature, about 110.6° C., for 14 hours while a toluene/water azeotrope is periodically distilled off until about 500 milliliters of distillate have been removed. The vessel is cooled and there is then introduced 4 millimoles of vanadium oxychloride. The contents of the vessel are thereafter continuously stirred, and maintained at refluxing temperature for about 10 hours while the gas phase is swept by a stream of dry nitrogen. Subsequently, the extent of the reaction between the vanadium oxychloride and the alumina is determined by measuring the quantity of HCl removed from the vessel by the nitrogen stream, and by testing the liquid contents of the vessel for the absence therein of vanadium oxychloride and the said alumina is found to contain a 4 milliatoms of vanadium bound to the surface of said alumina.

To a 2000 milliliter, stainless steel, stirred autoclave there is introduced 1000 milliliters of said cocatalyst slurry which contains about 2 milliatoms of vanadium chemically bound to the surface of about 5.3 grams of alumina. Next, there is added to said vessel 6 millimoles of triethylgermane dissolved in 200 milliliters of anhydrous toluene. The resulting mixture is then heated to and maintained at about 110° C. with continuous agitation for about 4 hours. Said autoclave is then cooled to and thereafter maintained at about 80° C. and there is then introduced thereinto propylene gas to a total pressure of about 200 p.s.i.g. After 8 hours of continuous agitation the solid product of the reaction is analyzed and it is found that polypropylene polymer has been produced.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black or additional silica, extenders, plasticizers, pigments, insecticides, fungicides, etc., can be incorporated into the polymers.

Obviously, many changes may be made in the above-described examples and procedure without departing from the scope of the invention. For example, although only transition metal chlorides are mentioned in the above examples, transition metal bromides, iodides and fluorides are also suitable for the purposes of the present invetntion. For example, titanium tetrafluoride is entirely suitable.

Accordingly, it is intended that the above disclosure be regarded as illustrative and as in no way limiting the scope of the invention.

What we claim is:

1. A process for polymerizing a substance chosen from the group consisting of mono-olefins, mixtures of mono-olefins, di-olefins, mixtures of di-olefins and mixtures thereof which comprises contacting said substance at temperatures between about −25° C. and 250° C., with a catalyst comprising the product of the reaction between
   (a) a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

wherein T is a metal chosen from the group consisting of the metals of Groups IVa, Va and VIa; O is oxygen; $a$ is a number from 0 to 2; each X is any halogen; $b$ is a number from 1 to 5; and where said structures are chemically linked directly from T to at least one oxygen atom in the surface of said solid, and
   (b) an organometallic compound conforming to the formula $$R_pH_tMO_{\frac{4-(t+p)}{2}}$$

wherein each R is chosen from the group consisting of monovalent hydrocarbon radicals, monovalent aryloxy radicals, and the halogens; $p$ is a number from 0 to 3; each H is a hydride radical; $t$ is a number from 1 to 4; M is a quadrivalent metal chosen from the group consisting of germanium, tin and lead; and O is oxygen.

2. The process of claim 1 wherein in said formula $$TO_aX_b$$

T it titanium, each X is chlorine and $b$ is 3.

3. The proces of claim 1 wherein the substance polymerized is an α-mono-olefin.

4. The process of claim 1 wherein the substance polymerized is a di-olefin having a double bond in the alpha position.

5. The process of claim 1 wherein each X in the formula $$TO_aX_b$$

is chlorine.

6. The process of claim 1 wherein in said formula $$TO_aX_b$$

T is a metal of Group IVa.

7. The process of claim 1 wherein in said formula $$TO_aX_b$$

T is titanium.

8. The process of claim 1 wherein in said formula $$TO_aX_b$$

T is a metal of Group Va.

9. The process of claim 1 wherein in said formula $$TO_aX_b$$

T is vanadium.

10. The process of claim 1 wherein in said formula $$TO_aX_b$$

T is a metal of Group VIa.

11. The process of claim 1 wherein the substance to be polymerized is chosen from the group consisting of ethylene, propylene and butene-1.

12. The process of claim 1 wherein in said formula $$R_pH_tMO_{\frac{4-(t+p)}{2}}$$

M is lead.

13. The process of claim 1 wherein in said formula $$R_pH_tMO_{\frac{4-(t+p)}{2}}$$

M is tin.

14. The process of claim 1 wherein in said formula $$R_pH_tMO_{\frac{4-(t+p)}{2}}$$

M is germanium.

15. The process of claim 1 wherein in said formula $$R_pH_tMO_{\frac{4-(t+p)}{2}}$$

M is tin; and each R is a monovalent hydrocarbon radical.

16. The process of claim 1 wherein in said formula $$R_pH_tMO_{\frac{4-(t+p)}{2}}$$

M is tin; each R is a monovalent hydrocarbon radical; and $p$ is 3.

17. The process of claim 1 wherein said inorganic solid is chosen from the group consisting of silica and alumina having an average particle diameter of less than about 100 millimicrons.

18. A catalyst comprising the product of the reaction between
   (a) a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

wherein T is a metal chosen from the group consisting of the metals of Groups IVa, Va, and VIa; O is ogygen; $a$ is a number from 0 to 2; each X is any halogen; $b$ is a number from 1 to 5; and where said structures are chemically linked directly from T to at least one oxygen atom in the surface of said solid, and
   (b) an organometallic compound conforming to the formula $$R_pH_tMO_{\frac{4-(t+p)}{2}}$$

wherein each R is chosen from the group consisting of monovalent hydrocarbon radicals, monovalent alkoxy radicals, monovalent aryloxy radicals, and the halogens; $p$ is a number from 0 to 3; each H is a hydride radical; $t$ is a number from 1 to 4; each M is a quadrivalent metal chosen from the group consisting of germanium, tin and lead; and O is ogygen.

19. The catalyst of claim 18 wherein each X in the formula $$TO_aX_b$$

is chlorine.

20. The catalyst of claim 18 wherein in said formula $$TO_aX_b$$

T is a metal of Group IVa.

21. The catalyst of claim 18 wherein in said formula $$TO_aX_b$$

T is titanium.

22. The catalyst of claim 18 wherein in said formula $$R_pH_tMO_{\frac{4-(t+p)}{2}}$$

M is tin.

23. The catalyst of claim 18 wherein in said formula $$R_pH_tMO_{\frac{4-(t+p)}{2}}$$

M is tin; each R is a monovalent hydrocarbon radical; and $p$ is 3.

References Cited by the Examiner
UNITED STATES PATENTS
2,820,778   1/58   Spaenig et al. _____ 260—94.9
FOREIGN PATENTS
823,024   11/59   Great Britain.

JOSEPH L. SCHOFER, *Primary Examiner.*